United States Patent [19]

Benning

[11] 4,033,422

[45] July 5, 1977

[54] APPARATUS FOR MANOEUVRING AIRCRAFT

[75] Inventor: Vernon A. Benning, Slough, England

[73] Assignee: M. L. Aviation Company Limited, Slough, England

[22] Filed: May 5, 1975

[21] Appl. No.: 574,687

[30] Foreign Application Priority Data

May 6, 1974 United Kingdom ............. 19858/74

[52] U.S. Cl. .............................. 180/14 C; 214/1 D; 244/50; 254/2 R
[51] Int. Cl.² ......................................... B64F 1/22
[58] Field of Search ..................... 214/1 D; 244/50; 180/14 C; 254/2 R, 2 B, 133 R; 280/8, 9, 10, 11, 46

[56] References Cited

UNITED STATES PATENTS

| | | | |
|---|---|---|---|
| 2,641,423 | 6/1953 | Harriman | 280/9 X |
| 2,785,807 | 3/1957 | Prowinsky | 214/DIG. 10 |
| 3,049,253 | 8/1962 | Cabral | 180/14 C X |

Primary Examiner—Robert J. Spar
Assistant Examiner—George F. Abraham
Attorney, Agent, or Firm—Larson, Taylor and Hinds

[57] ABSTRACT

An aircraft handler for manoeuvring aircraft fitted with skids comprises a self-propelled frame having at least two coaxial wheels, a drive motor for the wheels and a jacking system for engagement with a strong point on the underside of the aircraft structure. The frame is provided with a steering arm which extends rigidly from one end of the frame and includes at its end remote from the frame controls for the driving motor and jacking system whereby an operator can move the arm to steer the frame while having access to the controls for the driving motor and jacking system. The handler is used in combination with a wheel assembly for attachment to the rear ends of the skids of the aircraft and when the jacking system is engaged with the strong point on the aircraft and operated to raise the aircraft, the aircraft is then supported by the wheels at the ends of the skids and by the self-propelled frame which, under the steering control of the arm is fully manoeuvrable. The frame preferably includes electric batteries for supplying power both for driving and for the jacking system so as to constitute a self-contained unit, but it is also possible for the power to be drawn from an external source by way of a detachable electric lead.

16 Claims, 6 Drawing Figures

APPARATUS FOR MANOEUVRING AIRCRAFT

This invention relates to apparatus for manoeuvring aircraft on the ground and commonly referred to as an aircraft "handler." One form of such handler, for example as shown in British Pat. Specifications Nos. 845105 and 909697, is constructed as a small self-propelled vehicle which engages and drives one of the main load-bearing wheels of the aircraft. It may also be necessary to manoeuvre light aircraft fitted with skids, particularly helicopters. Previous handlers are quite unsuitable for this purpose and it is the object of the present invention to provide a handler capable of use with aircraft of this type.

According to the present invention such a handler comprises a self-propelled frame having at least two coaxial wheels driven by a motor, a jacking system for engagement with a strong point on the underside of the aircraft structure and a steering arm which extends rigidly from one end of the frame and includes at its end remote from the frame controls for the driving motor and jacking system. The handler is used in conjunction with a wheel assembly for attachment to the rear ends of the skids of the aircraft.

In operation the frame is moved beneath the aircraft and the jacking system is engaged with a strong point on the underside of the aircraft and located on the opposite side of the centre of gravity from the wheel assembly. The jacking system is then operated to raise the aircraft which is thus caused to take up a slight inclination with the weight shared between the self-propelled frame and the wheel assembly, with the skids clear of the ground. This renders the aircraft fully mobile and capable of being steered in any direction by means of the steering arm and all the operations so far described can be controlled directly by the operation holding the handle at the end of the arm. Since the handle is rigid with the frame and since the frame has coaxial wheels, steering control applied to the arm turns the frame as a whole in relation to the aircraft and allows it to move in whatever direction required.

The driving motor is preferably electrically powered, being mounted on the frame and driving the wheels through a differential. The jacking system is conveniently hydraulically operated by way of a pump driven by a second electric motor also mounted on the frame. Both motors and the pump are then remotely controlled from the end of the steering arm. It is not essential, however, that the electric motors and the hydraulic pump should be mounted on the frame itself. As an alternative these components may be arranged at the remote end of the steering arm, in which case the drive from the drving motor and the hydraulic pressure from the pump need to be transmitted along the steering arm to the driving wheels and jacking system respectively. With this alternative form of construction, the steering arm needs to be independently supported and may, for example, be fitted with a caster wheel at its remote end.

With either form of construction, the electric power is preferably supplied by batteries mounted on the frame so as to provide a completely self-contained unit. It is also possible for the power to be supplied from an external source through a detachable power lead. The jacking system may include a hydraulic cylinder pivoted at one end to the frame and connected at its other end to an extensible linkage which transmits the upward thrust.

As already described, the jacking system is intended to engage a strong point on the underside of the aircraft, but if no such strong point is available, a lifting beam may be fixed across the undercarriage structure, the strong point then being formed directly on this beam. The ends of the beam may be clamped either to the undercarriage structure itself or directly to the aircraft skids, by means of free-mounted adaptor brackets attached to the forward ends of the skids. The wheel assembly for attachment to the rear ends of the skids of the aircraft preferably comprises two separate sub-assemblies for attachment to the respective skids, each sub-assembly including a screw jack for adjusting the height of the wheel or wheels in relation to the remainder of the sub-assembly. As an alternative, a single assembly may be used which includes an axle extending across the width of the skids with a single wheel at each of its outer ends. The axle may be connected to each skid through a lift jack so that, with the wheels in position on the ground, the skids can be raised to the required extent. With either of these two arrangements, the manoeuvring capabilities of the apparatus are basically the same and the steering arm may be so designed as to give a steering angle of at least 100° on each side of the centre line so as to give considerable freedom of manoeuvre.

A construction of aircraft handler in accordance with the invention will now be described in more detail, by way of example, with reference to the accompanying drawings, in which:

FIG. 6 is a detailed view showing a wheel assembly secured in position to one end of an aircraft skid.

Figure 1:
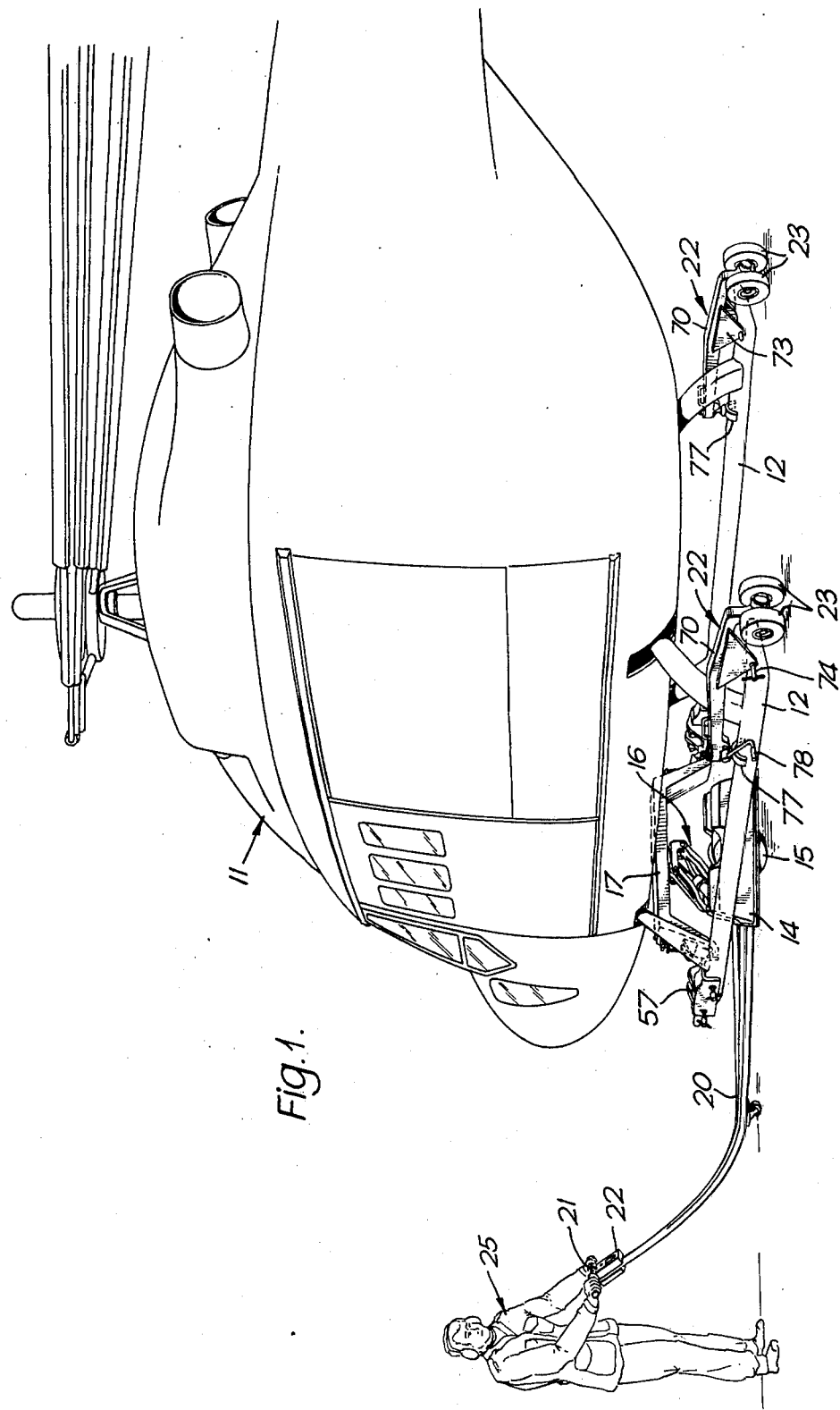
FIG. 1 is a perspective view showing the handler fitted in position beneath the skids of a helicopter.

Turning first to FIG. 1, a handler in accordance with the invention is shown fitted in position to a helicopter indicated generally as 11 having a pair of skids 12, but no wheels. The handler comprises basically a frame 14 fitted with a pair of coaxial wheels, part of one of which is seen at 15 and with a jacking system indicated generally as 16. The jacket system 16 is shown in engagement with a strong point defined by an arched cross member 17 fixed to the two skids 12 towards their forward ends. In addition, the frame has fixed to it a rigid steering arm 20 which curves upwardly to a handle 21 at its end remote from the frame 14, where it is fitted with a set of controls indicated diagrammatically as 22.

Since the jacking system 16 acts at a point forward of the centre of gravity of the helicopter 11, its effect is to raise the nose of the helicopter in relation to the rear ends of the skids 12 and these are fitted with assemblies 22 each including a pair of dolly wheels 23 which extend below the lower surface of each skid so as to support the aircraft at that point. In other words, a three-point support is provided by the pairs of wheels 23 and by the point of engagement of the jacking system 16 on the cross member 17. As will be described in more detail later, the controls 22 enable an operator shown as 25 to operate the jacking system 16 and a driving motor for the frame 14 and thus to manoeuvre the aircraft 11, since the fact that the steering arm 20 is rigidly attached to the frame 14 enables direct manual steering to be achieved very simply.

Details of the handler itself are seen better from FIGS. 2 to 5. As seen best from FIG. 5, the drive to the wheels 15 is obtained from an electric motor 30 controlled by the operator and driving a differential 31 by way of a shaft 32. The differential 31 has concentric outputs 33 driving two identical trains of gearing indicated generally as 35 which in turn drive the two wheels 15. Power for the motor 30 is derived from batteries 36 mounted on the outer side edges of the frame 14 and forming a self-contained unit. A second electric motor 38 also powered by the batteries 36 drives a hydraulic pump which forms part of a single unit with the motor 38. This provides hydraulic power for the jacking system 16 operated by the controls 22. The operating circuits for the motors 30 and 38 are contained within replaceable units 40, 41 and 42.

Figure 2:
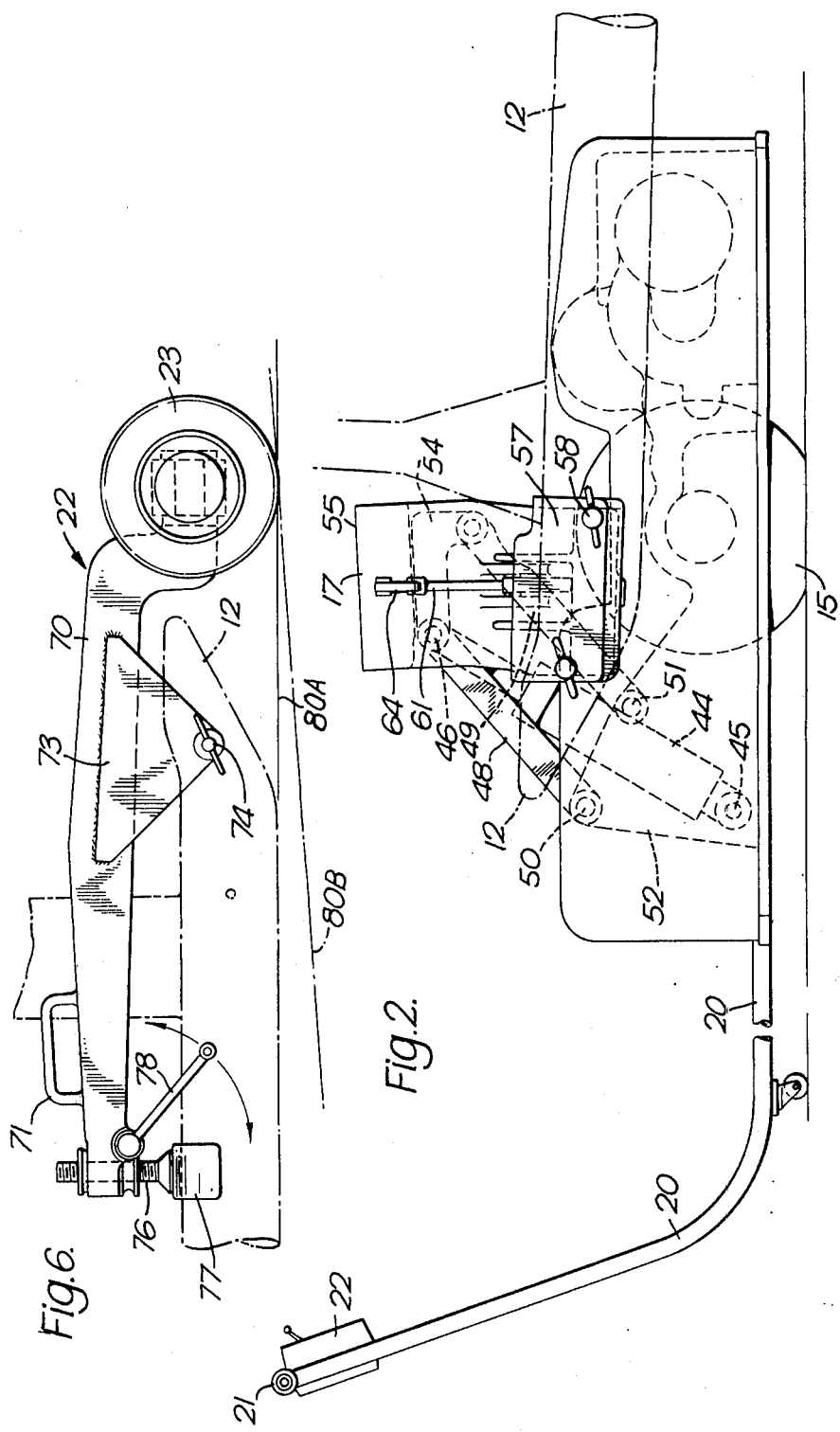
FIG. 2 is a side elevation of the handler showing a jacking system in its extended position.
Figure 3:
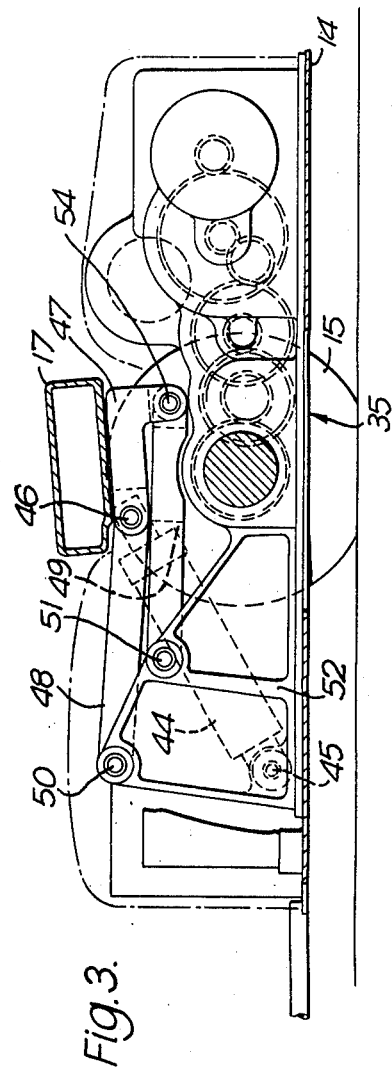
FIG. 3 is a view similar to FIG. 2, but with parts in section and parts broken away and showing the jacking system in its retracted position.
Figure 4:
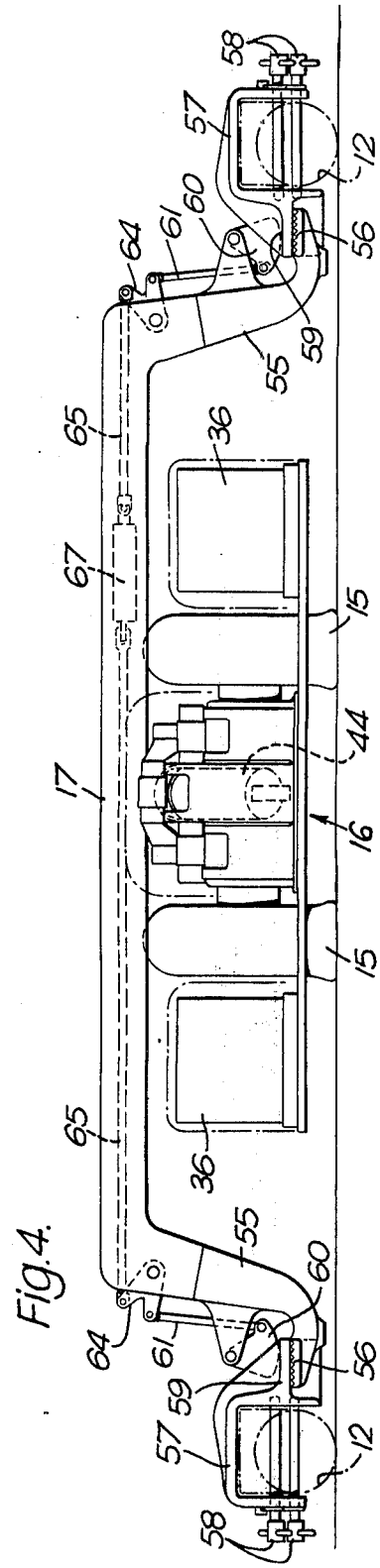
FIG. 4 is an end view corresponding to FIG. 3.
Figure 5:
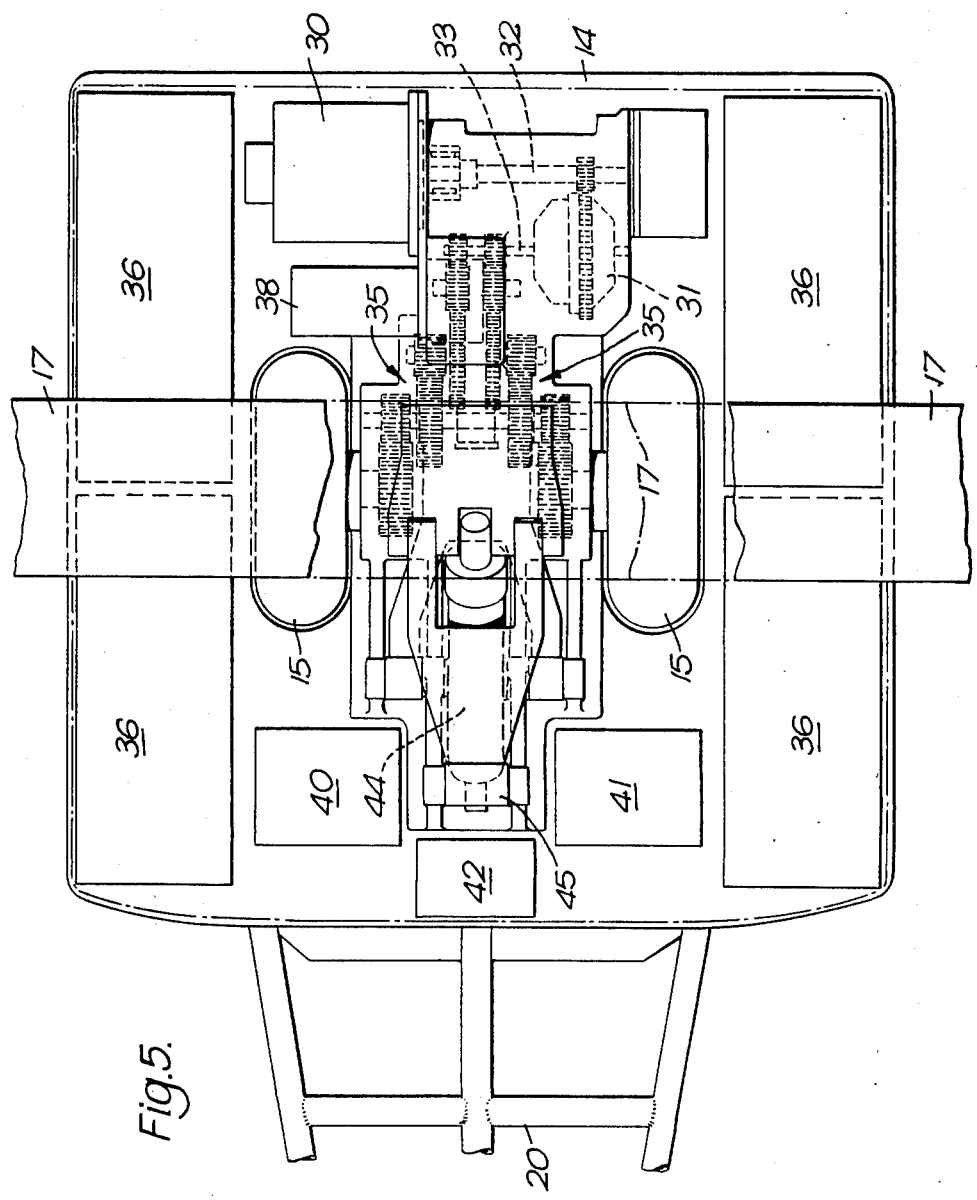
FIG. 5 is a plan view corresponding to FIG. 3.

Details of the jacking system itself are best seen from FIGS. 2 and 3. The system comprises a hydraulic cylinder 44 pivoted at its end to a mounting 45 on the frame 14 and at its upper end to a pivot 46 on a bearing member 47. The system also includes a pair of parallel links 48 and 49 pivoted at their left-hand ends as seen in FIGS. 2 and 3 to respective points 50 and 51 on a generally triangular support structure 52 forming part of the frame 14. The right-hand end of the link 48 is pivoted to the bearing member 47 and 46 while the right-hand end of the link 49 is pivoted to the bearing member 47 at 54.

In the retracted position of FIG. 3, the links 48 and 49 are substantially horizontal and the bearing member 47 is shown in engagement with the cross member 17 which is shown in cross-section and, as seen, is hollow. Supply of hydraulic fluid from the motor-pump unit 38 to the cylinder 44 causes the latter to extend and to pivot in a counterclockwise direction about the point 45. The two links 48 and 49 similarly turn in a counterclockwise direction about points 50 and 51 respectively and maintain the bearing member 47 in its generally horizontal position in engagement with the cross member 17, thus raising this and hence the forward end of the aircraft to the position of FIG. 1 with the weight distributed between the jacking system 16 and the two wheel assemblies 23.

If the aircraft is fitted with a built-in strong point, the bearing member 47 of the jacking system can engage directly with the strong point. There is no such strong point in the structure of the aircraft illustrated in FIG. 1 and it is for this reason that the cross member 17 needs to be fitted between the two skids 12. This cross member is shown in more detail in FIG. 4, with particular reference to the arrangements for fixing it to the skids 12. In addition to the main cross-portion 17, the member has two approximately vertical portions 55 which terminate in horizontal, serrated bearing surfaces 56 for engagement with clamps 57 which fit over the skids 12, being adjustable by hand-operated bolts 58. Each clamp 57 has a complementary serrated bearing surface 59 which is pressed against the surface 56 by a cam 60 operated by a control rod 61. Each contrl rod 61 is connected via a corresponding bell crank 64 to a rod 65 extending horizontally along the cross member 17. The ends of the two horizontal rods 65 are connected together by a remotely controlled hydraulic actuator 67 by means of which tension can be applied to the two rods 65 and hence to the rods 61 so as to turn the cams 60 and thus apply pressure between the engaging surfaces 56 and 59 at each side, thereby firmly locking the clamps 57 to the remainder of the assembly. By means of the arrangement just described, the cross member and its associated parts can be fitted to the skids of an aircraft in a very short space of time. thus rendering the aircraft capable of being manoeuvred by the handler.

In addition to the cross member 17, the wheel assemblies 22 need to be fitted to the rear ends of the skids 12. The arrangement for this purpose is illustrated to an enlarged scale in FIG. 6. As already described, each assembly 22 includes a pair of dolly wheels 23 each fitted with solid rubber tyres. The wheels are fitted to the rear of a body portion 70 provided with a carrying handle 71. This has welded to it a pair of triangular brackets 73 which fit on opposite sides of a skid 12 and are held in position by a hand operated bolt 74 passing through a hole in the body of the skid and about which the body 70 as a whole can turn. At the forward end of the body 70 is fitted a screw jack 76 having a bearing member 77 engaging the upper surface of the skid 12. The jack is operated by means of a handle 78 which drives the screw 76 through a worm drive.

When the assembly is initially fitted to the skid 12, the latter is in contact with the ground as indicated by the line 80A. The screw jack is fully retracted and with the wheels 23 resting on the ground, the bolt 74 is fitted in position and the bearing member 77 rests against the upper surface of the skid 12. With the bolt 74 in position, the handle 78 is turned to extend the jack 76 and thus turn the body 70 in a clockwise direction about the bolt 74 in relation to the skid 12, thus pressing the wheels 23 against the ground. As the operation of the jack continues, the skid is gradually lifted from the ground to a position in relation to the ground and which the ground is indicated by the line 80B. The rear ends of the two skids are thus supported by the wheel assemblies 22 and when the jacking system 16 is operated as previously described, the aircraft is ready for manoeuvring.

In the example just described, the drive is transmitted by the trains of gearing 35 to the axles of the wheels 15. In some circumstances it may be more convenient to drive the wheels through their peripheries rather than through their axles. For this purpose the gear trains 35 may be connected to serrated driving drums in engagement with the surfaces of the wheels, which are otherwise free to turn on their axles.

I claim:

1. An aircraft handler for manoeuvring aircraft fitted with skids, said handler comprising a self-propelled frame having at least two coaxial wheels, a motor connected to drive said wheels, a jacking system for engagement with a strong point on the underside of said aircraft, a steering arm which extends rigidly from one end of said frame and controls for said driving motor and jacking system, said controls being located at the end of said arm remote from said frame, and wherein said driving motor is an electric motor and is mounted on said frame, and including a differential gear provided between said motor and said wheels.

2. An aircraft handler according to claim 1 in which said jacking system is hydraulically operated and said frame carries a pump, a second electric motor connected to drive said pump and hydraulic connections between said pump and said jacking system.

3. An aircraft handler according to claim 2 and including electric batteries mounted on said frame and supplying power for both electric motors.

4. An aircraft handler according to claim 2 in which said jacking system includes a hydraulic cylinder and piston assembly having first and second ends and pivoted at said first end to said frame, to an extensible linkage connected to said second end of said assembly and a bearing member connected to said linkage.

5. An aircraft handler according to claim 1 in combination with a wheel assembly for attachment to the rear ends of said skids of said aircraft.

6. A combination according to claim 5 in which said wheel assembly comprises two separate sub-assemblies for attachment to the respective skids, each subassembly including at least one wheel and a screw jack for adjusting the height of said wheel in relation to the remainder of said sub-assembly.

7. An aircraft handler for manoeuvring aircraft fitted with skids, said handler comprising a self-propelled frame having at least two coaxial wheels, an electric motor mounted on said frame and connected to drive said wheels by means of a differential gear provided between said motor and said wheels, a jacking system for engagement with a strong point on the underside of said aircraft, a steering arm which extends rigidly from one end of said frame and controls for said driving motor and jacking system, said controls being located at the end of said arm remote from said frame, and wherein said jacking system includes a hydraulic cylinder and piston assembly having first and second ends and pivoted at said first end to said frame, and connected at said second end to an extensible linkage, and a pair of parallel links connecting said frame with said extensible linkage to maintain the extensible linkage in an essentially horizontal orientation during both the contracted and extended condition of said hydraulic cylinder and piston assembly.

8. An aircraft handler according to claim 7, in which said jacking system is hydraulically operated and said frame carries a pump, a second electric motor connected to drive said pump and hydraulic connections between said pump and said jacking system.

9. An aircraft handler according to claim 7, in combination with a wheel assembly for attachment to the rear ends of said skids of said aircraft.

10. An aircraft handler for manoeuvring aircraft fitted with skids, said handler comprising a self-propelled frame having at least two co-axial wheels, an electric motor mounted on said frame and connected to drive said wheels by means of a differential gear provided between said motor and said wheels, a jacking system, said jacking system including a lifting beam having spaced ends and means for connecting the ends of said lifting beam to said aircraft, a steering arm which extends rigidly from one end of said frame and controls for said drving motor and jacking system, said controls being located at the end of said arm remote from said frame.

11. An aircraft handler according to claim 10, in which said jacking system includes a hydraulic cylinder and piston assembly having first and second ends and pivoted at said first end to said frame, extensible linkage connected to said second end of said assembly and a bearing member connected to said linkage.

12. An aircraft handler according to claim 10 in combination with a wheel assembly for attachment to the rear ends of said skids of said aircraft.

13. An aircraft handler for manoeuvring aircraft fitted with skids, said handler comprising a self-propelled frame having at least two coaxial wheels, a motor connected to drive said wheels, a jacking system for engagement with a strong point on the underside of said aircraft, a steering arm which extends rigidly from one end of said frame and controls for said driving motor and jacking system, said controls being located at the end of said arm remote from said frame, and including wheel assemblies for attachment to the rear end of said skids of the aircraft.

14. A combination according to claim 13 in which said wheel assemblies comprises two separate subassemblies for attachment to the respective skids, each sub-assembly including at least one wheel and a screw jack for adjusting the height of said wheel in relation to the remainder of said sub-assembly.

15. In combination, an aircraft handler for manoeuvring aircraft fitted with skids and a wheel assembly for attachment to the rear end of said skids of the aircraft, said handler comprising a self-propelled frame having at least two coaxial wheels, a motor connected to drive said wheels, a jacking system for engagement with a strong point on the underside of said aircraft, a steering arm which extends rigidly from one end of said frame and controls for said driving motor and jacking system, said controls being located at the end of said arm remote from said frame, and wherein said jacking system includes a hydraulic cylinder and piston assembly having first and second ends and pivoted at said first end to said frame, and connected at said second end to an extensible linkage, and a pair of parallel links connecting said frame with said extensible linkage to maintain the extensible linkage in an essentially horizontal orientation during both the contracted and extended condition of said hydraulic cylinder and piston assembly.

16. In combination, an aircraft handler for manoeuvring aircraft fitted with skids and a wheel assembly for attachment to the rear ends of said skids of the aircraft, said handler comprising a self-propelled frame having at least two co-axial wheels, a motor connected to drive said wheels, a jacking system, said jacking system including a lifting beam having spaced ends and means for connecting the ends of said lifting beam to said aircraft, a steering arm which extends rigidly from one end of said frame and controls for said drving motor and jacking system, said controls being located at the end of said arm remote from said frame.

* * * * *